United States Patent [19]

Koons

[11] Patent Number: 4,459,157

[45] Date of Patent: Jul. 10, 1984

[54] ASPHALT COMPOSITION

[75] Inventor: Russell E. Koons, El Dorado, Ark.

[73] Assignee: Tosco Corporation, Santa Monica, Calif.

[21] Appl. No.: 399,277

[22] Filed: Jul. 19, 1982

[51] Int. Cl.$^3$ .............................................. C08L 95/00
[52] U.S. Cl. ..................................... 106/278; 524/59; 524/62; 524/69; 106/273 R
[58] Field of Search .................. 106/278, 273; 524/59, 524/62, 69; 208/44, 45

[56] References Cited

U.S. PATENT DOCUMENTS

| | | | |
|---|---|---|---|
| 3,440,073 | 4/1969 | Fowler et al. | 106/273 R |
| 4,077,928 | 3/1978 | Koons | 524/59 |
| 4,105,612 | 8/1978 | Cushman | 524/62 |
| 4,139,397 | 2/1979 | Yan | 208/44 |
| 4,207,117 | 6/1980 | Espenscheid | 106/278 |
| 4,273,685 | 6/1981 | Marzocchi | 427/389.8 |

OTHER PUBLICATIONS

*Kraton Rubber in Asphalt Products*, Shell Chemical Company, Dec. 1971.

*Primary Examiner*—Theodore Morris
*Attorney, Agent, or Firm*—Gary E. Lande; Lyle J. Schlyer

[57] ABSTRACT

An asphalt blend in which a butadiene-styrene elastomeric block polymer can easily be dispersed at between about 325° F. and about 400° F. and, after cooling, forms a stable material useful as a roofing composition and having a flash point of greater than about 450° F., said blend being composed of a propane extracted asphalt and from about 5 weight % to about 45 weight % of a fluid bed catalytic petroleum cracker bottoms oil comprising a major proportion of oils boiling above 700° F. and, optionally, a minor proportion of oils between about 350° F. and 700° F.

9 Claims, No Drawings

ASPHALT COMPOSITION

BACKGROUND OF THE INVENTION

The present invention relates to an asphalt composition which is easily mixed with a styrene-butadiene elastomeric block polymer to form a stable material which is useful for a number of purposes and is particularly useful as a roofing composition. The asphalt composition is a blend of one or more propane extracted petroleum asphalts and a fluid bed catalytic petroleum cracker bottoms oil. It has been found that this particular combination of ingredients of the asphalt blend composition is ideally suited for mixing with styrene-butadiene elastomeric block polymers because said asphalt blend is easily mixed with and forms a relatively stable composition with said elastomers.

It is known in the art that it is desirable to modify asphalt by adding elastomers. However, it is also known, e.g. see U.S. Pat. No. 4,273,685, that it is difficult to form stable compositions of an asphalt and an elastomer. This is particularly true of butadiene-styrene elastomers which are desirably added to asphalt to form, inter alia, roofing compositions as well as paving compositions.

It is also known in the art to add a bottoms oil produced from a fluid bed catalytic petroleum cracker to some types of asphalt for various reasons. See, for example, U.S. Pat. Nos. 4,105,612 and 4,207,117. However, neither of these patents utilize propane extracted asphalts and neither of these patents add the bottoms oil for the purpose of producing an asphalt blend which forms stable compositions with styrene-butadiene elastomers.

SUMMARY OF THE INVENTION

The principal object of the present invention is to disclose and provide an asphalt blend which is particularly useful for mixing with styrene-butadiene elastomers to form stable compositions which are extremely useful for roofing compositions.

Another object of the present invention is to embody an asphalt blend having a relatively high flash point and a relatively low asphaltene content.

Other objects of the present invention will be apparent from the following, more detailed, description of the invention.

Generally stated, the present invention is directed to an asphalt blend which has a flash point of greater than about 450° F., preferably greater than about 510° F., and an asphaltene content of less than 10 weight % and composed of one or more propane extracted petroleum asphalts and from 5 weight % to 45 weight % of a fluid bed catalytic petroleum cracker bottoms oil having a major proportion of oils boiling above 700° F., and optionally, a minor proportion of oils boiling less than 700° F., for example between about 350° F. and 700° F.

It has been found that such an asphalt blend is easily mixed with styrene-butadiene elastomers to form a substantially stable material which is very useful as a roofing composition, particularly when mixed with fiberglass as well as other filler materials, such as limestone, fine slate, clay, etc., in amounts varying from 10 weight % to 30 weight %.

One of the primary ingredients of the instant asphalt blend is propane extracted asphalt (hereinafter called P.E. Asphalt). As is known in the art, such asphalts are different than straight run asphalts, airblown asphalts, or vacuum distilled asphalts. The P.E. Asphalts of the present invention may be asphalts produced by solvent extraction of asphaltic flux, the primary solvent being propane. P.E. Asphalts contain less aliphatic and waxy constituents (which are generally soluble in propane) than do those asphalts obtained by vacuum distillation which merely remove the more volatile ingredients and thus reduce the penetration (i.e. increase the hardness) of the resulting asphalt. In addition, P.E. Asphalts are chemically considerably different than airblown asphalts.

The petroleum P.E. Asphalts of the present invention may be prepared by mixing an asphaltic petroleum flux with propane or a mixture of propane with $C_4$ or $C_5$ hydrocarbons and allowing the mixture to separate into two layers. The P.E. Asphalt is in the bottom layer. The length of time and the amount of propane solvent used to extract the flux or penetration grade asphalt will vary depending upon the penetration value desired in the P.E. Asphalt. Generally speaking, the conditions are such that the resulting Asphalt will have a penetration value, at 77° F., of about 0 to about 135, mm/10 as measured by ASTM D-5-65.

The P.E. Asphalts generally preferred in the present invention will have a penetration value of less than about 60 and it is even more preferred to use a mixture of P.E. Asphalts wherein the mixture has a penetration value of between about 15 and 50. For example, one may use a mixture containing about 52 weight % of a 6 to 9 penetration P.E. Asphalt and 48 weight % of 57 penetration P.E. Asphalt which forms a mixture having a penetration, at 77° F., of about 20.

It should be emphasized, however, that a single P.E. Asphalt having a low penetration, e.g., from 0 to 9, may be used successfully in the present invention.

The P.E. Asphalts may be prepared from any type of petroleum asphaltic flux derived from any type of crude oil. Generally, the P.E. Asphalts will comprise anywhere from 50 weight % to 95 weight % of the original starting material depending upon the desired penetration value of the P.E. Asphalt.

The other essential component of the asphalt blend of the present invention is the fluid bed catalytic petroleum cracker bottoms oil. Such bottoms oils are generally described in U.S. Pat. Nos. 4,105,612 and 4,202,117 although, as will be explained in more detail later, the bottoms oil of the present invention may contain oils which boil between 350° F. and 700° F., however, the major proportion of the bottoms oil will boil above 700° F.

The reason that some of the bottoms oils used in the present invention have such low boiling constituents is because the bottoms oil is located near the entrance point of the feedstock. The bottoms oils absorb a certain amount of the lower boiling constituents such as kerosene, diesel oil, gas oil No. 1 and gas oil No. 2. These constituents have not been found to be detrimental unless they are present in quantities sufficient to lower the flash point to less than 450° F. One, of course, may use a bottoms oil which do not contain such low boiling constituents, i.e. the bottoms oil will have an initial boiling point of around 700° F. or greater, e.g. 800° F.

In any event, the bottoms oil used in the present invention are the still bottoms from the distillation of petroleum crude resulting from a fluid bed catalytic cracking process. The bottoms oils of the present invention contain higher boiling complex aromatic constituents.

Such bottoms oils are combined with the P.E. Asphalts in amounts varying from about 5 weight % to as high as about 45 weight % depending upon the penetration value of the initial P.E. Asphalt and the desired penetration value of the asphalt blend. The greater the amount of bottoms oils used the softer the asphalt blend is, i.e. the higher the penetration value. The preferred amount of bottoms oil is between about 5 wt. % and 25 wt. %.

Depending on the final use of the blend and the amount of fillers, etc., it is generally desired that the asphalt blend have a penetration value, at 77° F., of greater than about 75 or 100 and for some uses it is preferred if the blend has a penetration value of between 180 and 220.

In order to produce a roofing composition from about 1 weight % to about 20 weight % of styrene-butadiene elastomeric block polymer is dispersed in the asphalt blend by heating the blend to between 325° F. and 400° F. and slowly adding the granular polymer with agitation, preferably in the absence of air by, for example, using nitrogen. The agitation is continued until a substantially homogeneous mixture is formed. As noted before, this is an excellent roofing composition having good stability and excellent weathering properties. If desired, this mixture of asphalt blend and styrene-butadiene elastomer may be modified by adding fiberglass and/or other fillers in an amount of anywhere from 5 weight % to 25 weight % as well as other fillers.

In the following examples, when it is indicated that a lower boiling bottoms oil is used, the oil had the following constituents as indicated in Table 1 below.

| Boiling Range (°F.) | Amount (Wt. %) |
|---|---|
| 370–476 | 0.7 |
| 476–600 | 1.6 |
| 600–650 | 2.0 |
| 650–700 | 9.8 |
| 700–750 | 19.4 |
| 750–800 | 18.3 |
| Above 800 | 48.2 |

When the examples indicate that it is a high boiling bottoms oil this means that the bottoms oil had an initial boiling point between 750° F. and 800° F.

EXAMPLE 1

This asphalt blend contained 63.4 weight % of 57 penetration P.E. Asphalt; 21 weight % of 7 penetration P.E. Asphalt and 15.5 weight % of low boiling bottoms oil. The mixture P.E. Asphalt had a penetration at 77° F., of 32.

The resulting blend had a softening point (Ring and Ball, ASTM D-36-76) of 103° F., a penetration, at 77° F., of 210 and a flash point of 550° F. as measured by the Cleveland Open Cup Test (C.O.C.). In addition, it had an asphaltene content of 9 weight % and a ductilty, at 77° F., of 101.

In order to test the stability of the above asphalt blend with styrene-butadiene elastomeric block polymer (Shell Chemical Company's Kraton 1101) it was dispersed in the blend, placed in a small can having a height three times its diameter, which was then placed in an oven for 3 days at 550° F. At the end of the three days, the asphalt composition was allowed to cool.

The asphalt composition was cut in the center to obtain a bottom and top portion. Each portion was melted and stirred and the softening point determined. It was found, that the softening point of the top was 222° F. and the softening point of the bottom was 219° F., indicating, in this severe test, that the composition had good stability.

EXAMPLE 2

This asphalt blend contained 90 weight % of 57 penetration P.E. Asphalt and 10 weight % of low boiling bottoms oil. The asphalt blend had a penetration value, at 77° F., of 190, a flash point, C.O.C. of 560° F., a softening point of 105° F., ductility, at 77° F., of 91 and an asphaltene content of 8.6 weight %.

The stability of this asphalt blend was determined in the same manner as in Example 1 and it was found that the top portion had a softening point of 225° F. and the bottom had a softening point of 224° F. which indicated good stability under these conditions.

EXAMPLE 3

The asphalt blend of this example contained about 95 weight % of 125 penetration P.E. Asphalt and 5 weight % high boiling bottoms oil. The asphalt blend had a softening point of 102° F., a penetration, at 77° F., of 206, a flash point, C.O.C., of 540° F., a ductility, at 77° F., of 112 and an asphaltene content of 7.5 weight %.

The stability of this asphaltene blend was conducted in the same manner as in Example 1 and it was found that the softening point of the top portion was 222° F. and the softening point of the bottom was 232° F.

EXAMPLE 4

The asphalt blend of this example contained 67.5 weight % of 57 penetration P.E. Asphalt and 33.5 weight % of low boiling decant oil. The resulting asphalt blend had a penetration, at 77° F., of 200. A stability test was run on this asphalt blend in the same manner as Example 1 except the test was only one day at 350° F. The top part of the blend had a softening point of 190° F. and the bottom part of the asphalt blend had a softening point of 192° F. indicating very good stability.

I claim:

1. An asphalt blend in which a butadiene-styrene elastomeric block polymer can easily be dispersed at between about 325° F. and about 400° F. and, after cooling, forms a stable material useful as a roofing composition and having a flash point of greater than about 450° F., said blend consisting essentially of a propane extracted asphalt, said propane extracted asphalt having been prepared by mixing an asphaltic petroleum flux with propane, with or without other solvents, and allowing the mixture to separate into layers and collecting the propane extracted asphalt from the bottom layer, and from about 5 weight % to about 45 weight % of a fluid bed catalytic petroleum cracker bottoms oil comprising a major proportion of oils boiling above 700° F. and, optionally, a minor proportion of oils boiling between about 350° F. and 700° F.

2. An asphalt blend according to claim 1 wherein said asphalt blend has an asphaltene content of less than about 10 weight %.

3. An asphalt blend according to claim 2 wherein said blend has a flash point of greater than about 510° F.

4. An asphalt blend according to claim 3 where the fluid bed catalytic petroleum cracker bottoms oil is present in an amount of from about 5 wt. % to about 25 wt. %.

5. An asphalt blend according to claim 4 having a penetration value, at 77° F., of greater than 75.

6. An asphalt blend according to claim 5 wherein the propane extracted asphalt has a penetration value, at 77° F., of less than about 60.

7. An asphalt blend according to claim 5 wherein the propane extracted asphalt is a mixture of propane extracted asphalts, said mixture having a penetration value, at 77° F., of between about 15 and 50.

8. An asphalt blend according to claim 1 wherein said fluid bed catalytic petroleum cracker bottoms has an initial boiling point of between about 700° F. and 800° F.

9. An asphalt blend according to claim 1 wherein said fluid bed catalytic cracker petroleum bottoms oil has an initial boiling point of about 800° F.

* * * * *